United States Patent Office.

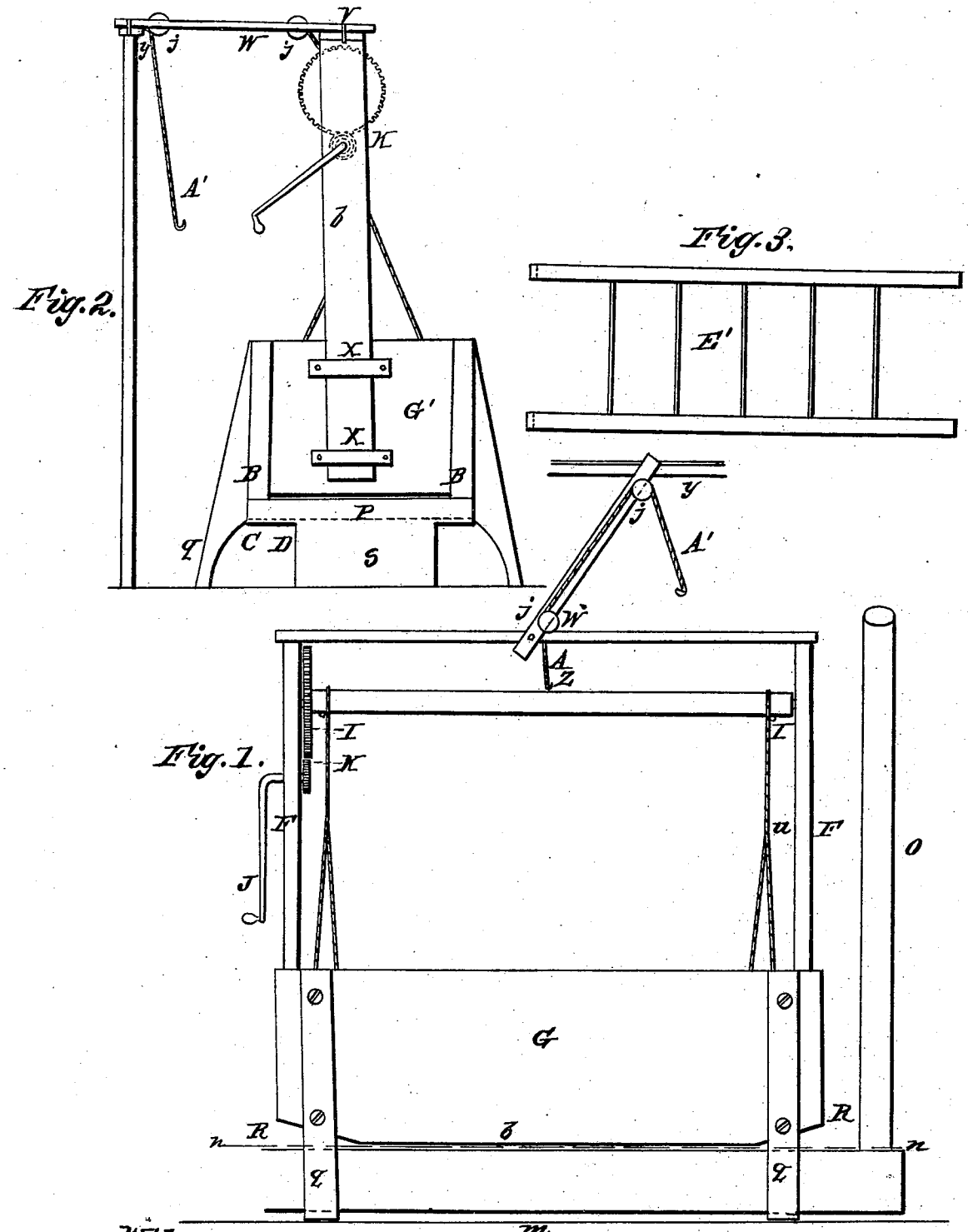

GIDEON KING, OF EMINENCE, KENTUCKY.

Letters Patent No. 77,198, dated April 28, 1868.

IMPROVEMENT IN HOG-SCALDING TANK.

*The Schedule referred to in these Letters Patent and making part of the same.*

Be it known that I, GIDEON KING, of the town of Eminence, in the county of Henry, and State of Kentucky, have invented a new and useful Improvement on Farmers' Hog-Scalding Tank, with fixtures for swinging hogs attached; and I do hereby declare that the following is a full, clear, and exact description of the construction and operation of the same, reference being had to the annexed drawings, making a part of this specification, in which—

Figure 1 is a plain side view.

Figure 2 is a view of one end.

Figure 3 is a rack, which operates inside the tank.

The old tank consists of a square, wooden box, made of thick plank on sides and ends, with plain sheet-iron bottom, nailed on without any fixtures whatever.

My improvement consists—

First, in bevelling the sides at each end, as at R R, fig. 1, in order to raise the ends G', fig. 2, sufficiently high to secure protection to them from fire in furnace S, by means of adjustable sheet-iron plates being placed or inserted underneath the bevel, indicated by dotted lines N N, fig. 1, the smoke-pipe O passing through one of the plates at R N.

Second, I bend sheet iron, M, and form a right-angled triangle shape D D, fig. 2. One side or leg of the angle of the iron is made fast to the bottom, under the sides B B, covering them sufficiently to protect them from the effect of fire from the furnace S. The other angle or leg is extended to the ground, in order to form the fire-furnace, S.

Third, in order to plunge the hog into and raise it out of the tank easily, I confine, perpendicularly, shafts, F F, fig. 1, to the ends of the tank at G', fig. 2, by means of sockets X X, (or their equivalents,) which shafts support windlass H, fig. 1, over the centre of the tank. The windlass is made to revolve, when driven, by crank T, which drives a small cog-wheel, K, driving a large cog-wheel, K', confined to the end of the windlass H, to which rack E, fig. 3, is attached, by means of ropes $u$ $u$, hooked in staples I I, which rack receives and bears up the hog, and on which it is let into and raised out of the tank or hot water at pleasure, by moving the crank T back or forward.

Fourth, the hog, when scalded and cleaned, I draw to pole $y$, fig. 1, to be hanged (for removing the entrails) by means of rope A', being attached to windlass H at Z or I I, and running or working on pulleys $j$ $j$, which operate in each end of pole $w$, one end of which rests on pole $y$, with the other on pole $v$, the latter being made fast on the upper ends of the shafts F F, which are confined to the tank G.

What I claim as my improvements, and desire to secure by Letters Patent, is—

1. I claim the bevels R R, and the adjustable sheet-iron plates N N, when applied to the tank G, as and for the purpose described.

2. I claim the sheet iron, M, with the angle D D, when confined to the tank G, as and for the purpose set forth.

3. I claim the crank, T, cog-wheels K, windlass H, and rack E, in combination with the shafts F F, when arranged, constructed, and attached to the tank G, as and for the purpose specified.

4. I claim rope A', pulleys $j$ $j$, pole $w$, and pole $v$, in combination with shafts F F, when constructed and operated substantially as and for the purpose described.

GIDEON KING.

Witnesses:
JAMES L. ALLEN,
W. J. THOMAS.